(12) United States Patent
Yamarthi et al.

(10) Patent No.: US 12,473,874 B2
(45) Date of Patent: Nov. 18, 2025

(54) DUAL COMPRESSION-EXPANSION PUMPS AND RELATED METHODS

(71) Applicant: General Electric Company, Schenectady, NY (US)

(72) Inventors: David Raju Yamarthi, Bengaluru (IN); Rodrigo Rodriguez Erdmenger, Garching (DE); Maysaa Rizk, Garching (DE); Adam Joseph Wangler, Evendale, OH (US); Ismail Hakki Sezal, Garching (DE)

(73) Assignee: General Electric Company, Evendale, OH (US)

( * ) Notice: Subject to any disclaimer, the term of this patent is extended or adjusted under 35 U.S.C. 154(b) by 262 days.

(21) Appl. No.: 18/149,570

(22) Filed: Jan. 3, 2023

(65) Prior Publication Data
US 2024/0167433 A1  May 23, 2024

(30) Foreign Application Priority Data

Nov. 17, 2022 (IN) .............................. 202211065969

(51) Int. Cl.
*F02K 3/00* (2006.01)
*F02C 7/141* (2006.01)

(52) U.S. Cl.
CPC ................ *F02K 3/00* (2013.01); *F02C 7/141* (2013.01); *F05D 2220/323* (2013.01); *F05D 2240/50* (2013.01); *F05D 2240/60* (2013.01)

(58) Field of Classification Search
CPC .... F04D 29/584; F04D 13/06; F04D 29/5806; F04D 25/024; F04D 29/5826; F04D 25/06; F04D 17/10; F04D 17/122; F04D 25/0606; F04D 29/4206; H02K 5/203; H02K 5/20; B64D 2013/0648; B64D 13/06;
(Continued)

(56) References Cited

U.S. PATENT DOCUMENTS

| 3,583,156 A | 6/1971 | Schabert |
| 4,125,345 A * | 11/1978 | Yoshinaga .......... F04D 25/0606 417/244 |

(Continued)

FOREIGN PATENT DOCUMENTS

| CN | 212406844 | 1/2021 |
| CN | 214660402 | 11/2021 |

(Continued)

OTHER PUBLICATIONS

European Patent Office, "Extended European Search Report," issued in connection with European Patent Application No. 23172383.4-1004, mailed on Oct. 23, 2023, 8 Pages.

*Primary Examiner* — Mark A Laurenzi
*Assistant Examiner* — Benjamin Doyle
(74) *Attorney, Agent, or Firm* — HANLEY, FLIGHT & ZIMMERMAN, LLC

(57) ABSTRACT

Dual compression-expansion pumps and related methods are disclosed. An example fluid pump includes a shaft, a motor coupled to the shaft, the motor to drive a rotation of the shaft, a compressor coupled to a first end of the shaft, a turbine coupled to a second end of the shaft opposite the first end, and a housing including a first inlet, a second inlet, a third inlet, a first outlet, and a second outlet, the first outlet fluidly coupled to the second inlet, the second outlet fluidly coupled to the third inlet.

19 Claims, 7 Drawing Sheets

(58) Field of Classification Search
CPC ... B64D 2013/0644; F02K 3/00; F02C 7/141; F02C 7/32; F02C 7/14; F05D 2220/323; F05D 2240/50; F05D 2240/60; F05D 2260/213
USPC .................................................... 417/423.14
See application file for complete search history.

(56) References Cited

U.S. PATENT DOCUMENTS

| | | | | |
|---|---|---|---|---|
| 5,248,239 | A * | 9/1993 | Andrews | F01D 25/16 415/105 |
| 6,164,084 | A * | 12/2000 | Watson | H02K 5/207 310/60 R |
| 6,310,414 | B1 * | 10/2001 | Agahi | F01D 3/04 415/105 |
| 8,430,653 | B2 * | 4/2013 | Frosini | F04D 29/054 417/423.12 |
| 9,016,083 | B2 * | 4/2015 | Okuda | F25B 9/004 62/402 |
| 10,415,857 | B2 * | 9/2019 | Ueda | F25J 1/0065 |
| 10,443,495 | B2 | 10/2019 | Conde | |
| 10,954,824 | B2 | 3/2021 | Laskowski et al. | |
| 2007/0068178 | A1 * | 3/2007 | Honma | F25B 49/02 62/160 |
| 2007/0101756 | A1 * | 5/2007 | Okuda | F25B 9/004 62/272 |
| 2009/0044548 | A1 * | 2/2009 | Masoudipour | F25B 1/04 62/505 |
| 2009/0127956 | A1 * | 5/2009 | Ozaki | F16C 39/06 310/90.5 |
| 2009/0217693 | A1 * | 9/2009 | Kikuchi | H02K 9/04 165/181 |
| 2011/0005244 | A1 * | 1/2011 | Finney | F25B 9/06 62/87 |
| 2011/0239694 | A1 * | 10/2011 | Sugitani | F04D 25/0606 415/122.1 |
| 2015/0089949 | A1 | 4/2015 | Eng | |
| 2016/0032931 | A1 * | 2/2016 | Lee | F04D 29/584 417/368 |
| 2016/0096629 | A1 * | 4/2016 | Vaisman | F25B 9/06 62/115 |
| 2016/0265545 | A1 * | 9/2016 | Ueda | F04D 29/058 |
| 2017/0175754 | A1 * | 6/2017 | Hofer | F04D 29/284 |
| 2017/0254229 | A1 | 9/2017 | Fletcher | |
| 2019/0041124 | A1 * | 2/2019 | Berti | F25B 11/04 |
| 2019/0049156 | A1 | 2/2019 | Vaisman et al. | |
| 2020/0166050 | A1 * | 5/2020 | Park | F04D 29/4206 |
| 2020/0256344 | A1 * | 8/2020 | Sakota | F04D 29/057 |
| 2021/0148283 | A1 * | 5/2021 | Niergarth | F02C 7/185 |
| 2022/0077798 | A1 | 3/2022 | Kalra et al. | |
| 2022/0348335 | A1 | 11/2022 | Ho et al. | |
| 2022/0372994 | A1 * | 11/2022 | Defoy | F04D 17/12 |
| 2023/0108681 | A1 * | 4/2023 | Shinoda | F04D 29/053 415/170.1 |
| 2023/0110813 | A1 * | 4/2023 | Nakayama | F04D 29/5813 165/80.3 |
| 2023/0204037 | A1 * | 6/2023 | Mori | F04D 25/0606 417/350 |
| 2023/0286657 | A1 | 9/2023 | Barthes | |
| 2024/0263646 | A1 * | 8/2024 | Yamarthi | F04D 27/023 |

FOREIGN PATENT DOCUMENTS

| | | |
|---|---|---|
| CN | 114215606 | 3/2022 |
| EP | 2807348 | 4/2019 |
| WO | 2022028992 A1 | 2/2022 |

* cited by examiner

DUAL COMPRESSION-EXPANSION PUMPS AND RELATED METHODS

RELATED APPLICATION

This patent claims the benefit of Indian Provisional Patent Application No. 202211065969, which was filed on Nov. 17, 2022. Indian Provisional Patent Application No. 202211065969 is hereby incorporated herein by reference in its entirety. Priority to Indian Provisional Patent Application No. 202211065969 is hereby claimed.

FIELD OF THE DISCLOSURE

This disclosure relates generally to fluid pumps and, more particularly, to dual compression-expansion pumps and related methods.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed from a fluid (e.g., oil, air, etc.) during operation of these accessory systems.

BRIEF DESCRIPTION OF THE DRAWINGS

In general, the same reference numbers will be used throughout the drawing(s) and accompanying written description to refer to the same or like parts. The figures are not substantially to scale.

DETAILED DESCRIPTION

Figure 1:
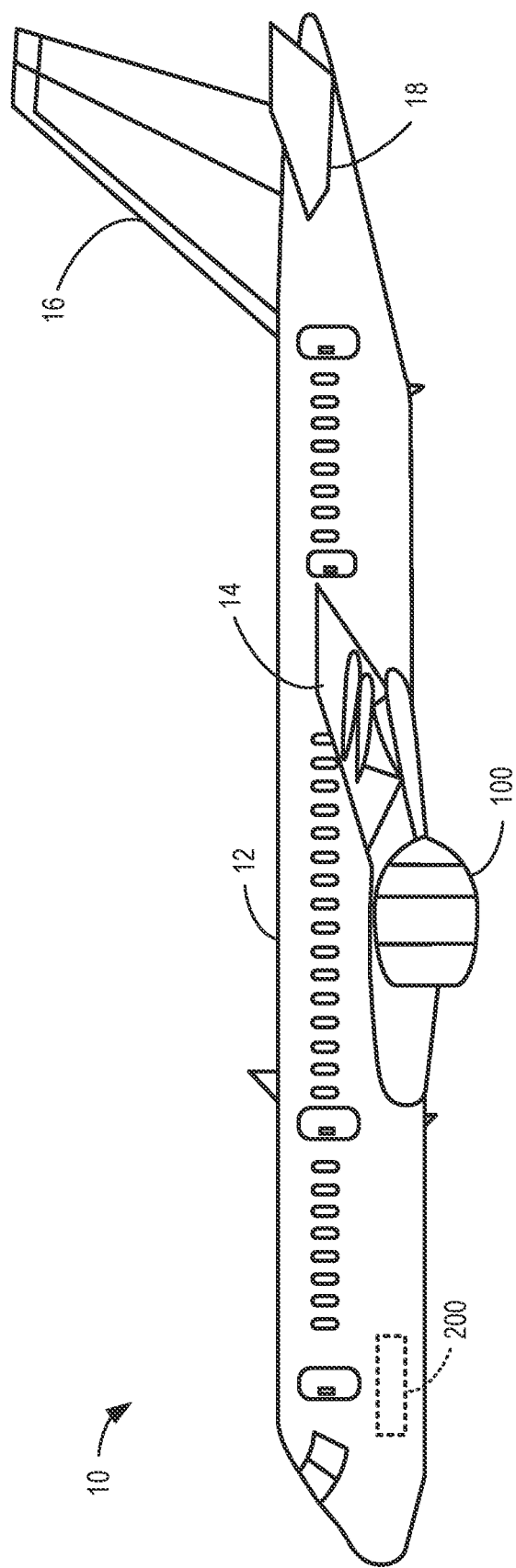
FIG. 1 is a side view of an example aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this application, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust. Further, with regard to a pump, forward refers to a position closer to a pump inlet and aft refers to a position closer to an end of the pump opposite the inlet.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

Centrifugal fluid pumps move fluid through systems by converting rotational kinetic energy of an impeller to hydrodynamic energy of a flowing fluid. In other words, the angular velocity of the impeller is directly proportional to the flow rate of the flowing fluid exiting the pump. The impeller is provided a change in rotational kinetic energy from an electric motor applying mechanical work to an impeller shaft coupled to the impeller and to the rotor of the electric motor. The rotor is provided a change in mechanical work over a period of time (i.e., mechanical power) from a stator in the electric motor applying electromagnetic forces to the rotor in the form of torque. If the motor supplies a constant amount of electrical energy to the stator, then the rotor will supply a constant amount of mechanical energy to the impeller. In this case, the mechanical power supplied to the pump by the electric motor would be equal to the quotient of the rotational kinetic energy and the amount of time the power is being supplied. In rotational systems, such as a centrifugal fluid pump, the mechanical power of the impeller is equal to the product of the torque and the angular velocity. When the rotor of the electric motor and the impeller shaft of the centrifugal fluid pump are coupled axially, the torque and angular velocity of the rotor transfers to the impeller. Such centrifugal pumps can be utilized to drive a heat exchange fluid through a thermal transport bus to maintain working fluids and/or components of a system within a certain temperature range.

Conventional thermal transport systems utilize a centrifugal pump that drives the heat exchange fluid through one or more heat sink or source heat exchangers to control the thermal energy within the system. Accordingly, the thermal transport bus can carry the heat exchange fluid to components of a system that need to be cooled or heated for certain operations. Further, conventional thermal transport systems utilize heat sink heat exchangers to cool the heat exchange fluid and enable the cooled heat exchange fluid to cool pump components, such as a motor. However, heat sink heat exchangers increase a size, a weight, and a cost of the thermal transport system.

Examples of heat exchange system disclosed herein include dual compression-expansion pumps. An example pump includes a compressor and a turbine coupled to opposite ends of a motor shaft. The compressor drives fluid that enters a first inlet of the pump through a first outlet of the pump. Further, one or more conduit(s) in fluid connection with the first outlet can convey the fluid to one or more heat source heat exchangers that cause the fluid to absorb heat from other fluids and/or components of a system associated with the thermal management system. Further, the conduit(s) convey at least a portion of the fluid to the turbine, which expands and cools the fluid. The flow of the fluid exerts a tangential force on the turbine that provides an angular acceleration to the turbine and, in turn, the shaft and the compressor, which can reduce the work required by the motor to drive the shaft. Additionally, a thrust load encountered by the turbine can help balance a thrust load encountered by the compressor. Thus, the pump can operate without, or with a smaller, thrust bearing.

In response to the turbine cooling the fluid, the conduit(s) deliver the fluid to a motor casing to enable the fluid to cool the motor. Advantageously, by cooling the fluid, the turbine enables heat sink heat exchangers in the thermal management system to be removed or otherwise reduced. As a result, the turbine helps reduce a size, a weight, and a cost associated with the thermal management system. Additionally, the cooled fluid in the motor casing helps reduce vibrations encountered by the motor shaft at higher temperatures (e.g., temperatures greater than 200 degrees Fahrenheit (° F.)).

Referring now to the drawings, FIG. 1 is a side view of an aircraft 10 in which examples disclosed herein can be implemented. As shown, in several examples, the aircraft 10 includes a fuselage 12 and a pair of wings 14 (one is shown) extending outward from the fuselage 12. In the illustrated example, a gas turbine engine 100 is supported on each wing 14 to propel the aircraft through the air during flight. Additionally, as shown, the aircraft 10 includes a vertical stabilizer 16 and a pair of horizontal stabilizers 18 (one is shown). However, in alternative examples, the aircraft 10 may include any other suitable configuration, such as any other suitable number or type of engines.

Furthermore, the aircraft 10 may include a thermal management system 200 for transferring heat between fluids that support the operation of the aircraft 10. More specifically, the aircraft 10 may include one or more accessory systems configured to support the operation of the aircraft 10. For example, in some examples, such accessory systems include a lubrication system that lubricates components of the engines 100, a cooling system that provides cooling air to components of the engines 100, an environmental control system that provides cooled air to the cabin of the aircraft 10, and/or the like. In such examples, the thermal management system 200 is configured to transfer heat to and/or from one or more fluids supporting the operation of the aircraft 10 (e.g., the oil of the lubrication system, the air of the cooling system and/or the environmental control system, and/or the like) from and/or to one or more other fluids supporting the operation of the aircraft 10 (e.g., the fuel supplied to the engines 100). However, in alternative examples, the thermal management system 200 may be configured to transfer heat between any other suitable fluids supporting the operation of the aircraft 10.

The configuration of the aircraft 10 described above and shown in FIG. 1 is provided to place the present subject matter in an example field of use. Thus, the present subject matter may be readily adaptable to any manner of aircraft, land-based vehicles, marine-based vehicles, electronic devices and systems, and/or any other suitable heat transfer application.

Figure 2:
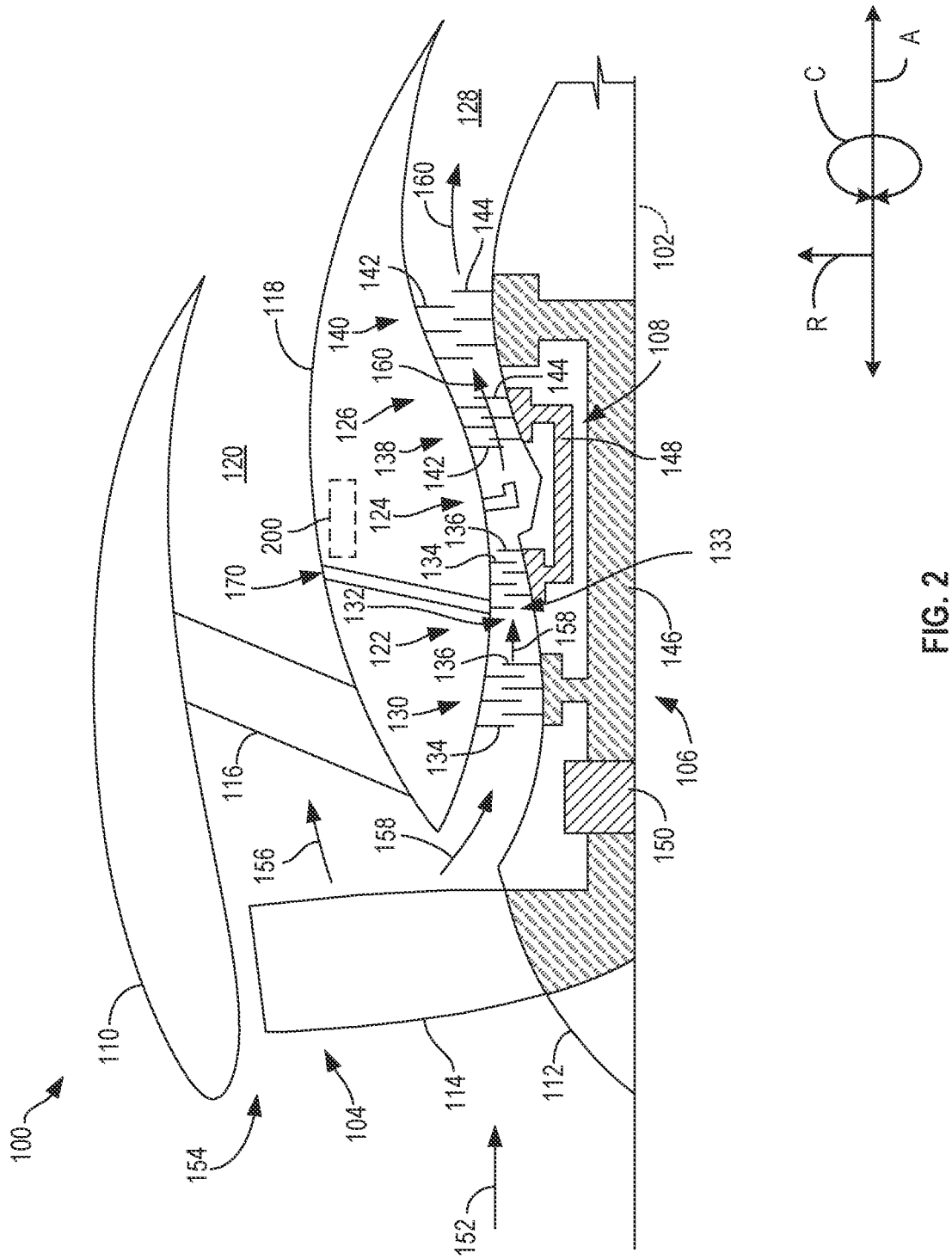
FIG. 2 is a schematic cross-sectional view of an example gas turbine engine of an aircraft.

FIG. 2 is a schematic cross-sectional view of one example of a gas turbine engine 100 in which examples disclosed herein can be implemented. In the illustrated example, the engine 100 is configured as a high-bypass turbofan engine. However, in alternative examples, the engine 100 may be configured as a propfan engine, a turbojet engine, a turboprop engine, a turboshaft gas turbine engine, or any other suitable type of gas turbine engine.

In general, the engine 100 extends along an axial centerline 102 and includes a fan 104, a low-pressure (LP) spool 106, and a high-pressure (HP) spool 108 at least partially encased by an annular nacelle 110. More specifically, the fan 104 may include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, thereby permitting the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. In some examples, the compressor section 122 may include a low-pressure (LP) compressor 130 of the LP spool 106 and a high-pressure (HP) compressor 132 of the HP spool 108 positioned downstream from the LP compressor 130 along the axial centerline 102. Each compressor 130, 132 may, in turn, include one or more rows of stator vanes 134 interdigitated with one or more rows of compressor rotor blades 136. As such, the compressors 130, 132 define a compressed air flow path 133 extending therethrough. Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 may, in turn, include one or more rows of stator vanes 142 interdigitated with one or more rows of turbine rotor blades 144.

Additionally, the LP spool 106 includes the low-pressure (LP) shaft 146 and the HP spool 108 includes a high pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown in the example of FIG. 2, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 generates thrust to propel an aircraft (e.g., the aircraft 10 of FIG. 1, etc.). More specifically, during operation, air (indicated by arrow 152) enters an inlet portion 154 of the engine 100. The fan 104 supplies a first portion 156 (indicated by arrow 156) of the air 152 to the bypass airflow passage 120 and a second portion 158 (indicated by arrow 158) of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 where the turbine rotor blades 144 of the HP turbine 138 extract a first portion of kinetic and/or thermal energy from the combustion gases 160. This energy extraction rotates the HP shaft 148, which drives the HP compressor 132. The combustion gases 160 then flow through the LP turbine 140 in which the turbine rotor blades 144 of the LP turbine 140 extract a second portion of kinetic and/or thermal energy from the combustion gases 160. This energy extraction rotates the LP shaft 146, thereby driving the LP compressor 130 and the fan 104 via the gearbox 150. The combustion gases 160 then exit the engine 100 through the exhaust section 128.

Furthermore, in some examples, the engine 100 defines a third-stream flow path 170 (e.g., a compressed air flow path). In general, the third-stream flow path 170 extends from the compressed air flow path 133 defined by the compressor section 122 to the bypass airflow passage 120. In this respect, the third-stream flow path 170 allows a portion of the compressed air 158 from the compressor section 122 to bypass the combustion section 124. More specifically, in some examples, the third-stream flow path 170 may define a concentric or non-concentric passage relative to the third-stream flow path 170 downstream of one or more of the compressors 130, 132 or the fan 104. The third-stream flow path 170 may be configured to selectively remove a portion of compressed air 158 from the third-stream flow path 170 via one or more variable guide vanes, nozzles, or other actuation systems.

As mentioned above, the aircraft 10 may include a thermal management system 200 for transferring heat between fluids supporting the operation of the aircraft 10. In this respect, the thermal management system 200 may be positioned within the engine 100. For example, as shown in FIG. 2, the thermal management system 200 is positioned within the outer casing 118 of the engine 100. However, in alternative examples, the thermal management system 200 may be positioned at any other suitable location within the engine 100.

In addition, as will be described below, the thermal management system 200 helps control thermal energy encountered by the engine 100. For example, the thermal management system 200 can transfer heat to the fuel to be provided to the combustion section 124, the air flowing through the third-stream flow path 170, the outer casing 118, and/or any other component associated with the engine 100. Furthermore, the thermal management system 200 can extract heat from working fluids and/or engine components. However, a temperature, a pressure, and/or a flow rate of a fluid (e.g., a heat exchange fluid such as a supercritical fluid (e.g., sCO2, etc.)) within the thermal management system 200 limits a rate at which thermal energy is transferred between the heat exchange fluid and the fuel, the air, and/or the engine components. Additionally, it is advantageous for the thermal management system 200 to produce the pressure and/or the flow rate with components (e.g., pump systems) that minimize and/or otherwise reduce a physical size of the thermal management system 200, such as by removing or reducing a need for, or otherwise reducing a size of, components (e.g., pump systems) of the thermal management system 200.

The configuration of the gas turbine engine 100 described above and shown in FIG. 2 is provided to place the present subject matter in an example field of use. Thus, the present subject matter may be readily adaptable to any manner of gas turbine configuration, including other types of aviation-based gas turbine engines, marine-based gas turbine engines, electrical power generation turbines, and/or land-based/industrial gas turbines.

Figure 3:
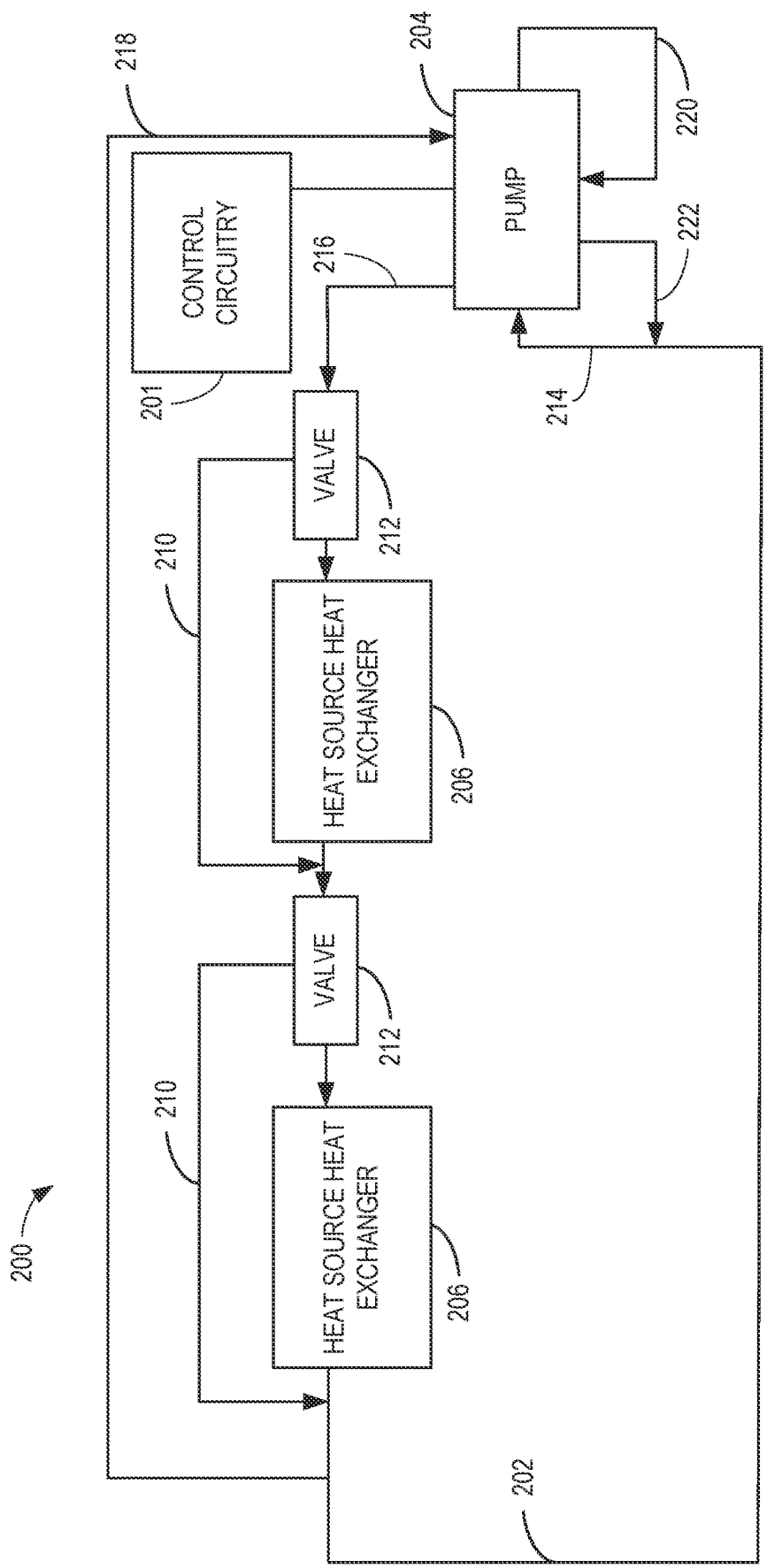
FIG. 3 is a schematic diagram of an example thermal management system for transferring heat between fluids.

FIG. 3 is a schematic view of an example implementation of the thermal management system 200 for transferring heat between fluids. In general, the thermal management system 200 will be discussed in the context of the aircraft 10 and the gas turbine engine 100 described above and shown in FIGS. 1 and 2. However, the disclosed thermal management system 200 may be implemented within any aircraft having any other suitable configuration and/or any gas turbine engine having any other suitable configuration.

As shown, the thermal management system 200 includes a thermal transport bus 202. Specifically, the thermal transport bus 202 is configured as one or more fluid conduits through which a fluid (e.g., a heat exchange fluid) flows. As will be described below, the heat exchange fluid flows through various heat exchangers such that heat is added to the heat exchange fluid. In this respect, the heat exchange fluid may be any suitable fluid, such as supercritical carbon dioxide. Moreover, the thermal management system 200 includes a pump 204 configured to pump the heat exchange fluid through the thermal transport bus 202.

Additionally, the thermal management system 200 includes one or more heat source heat exchangers 206 arranged along the thermal transport bus 202. More specifically, the heat source heat exchanger(s) 206 is fluidly coupled to the thermal transport bus 202 such that the heat exchange fluid flows through the heat source heat exchanger(s) 206. In this respect, the heat source heat exchanger(s) 206 is configured to transfer heat from fluids supporting the operation of the aircraft 10 to the heat exchange fluid, thereby cooling the fluids supporting the operation of the aircraft 10. Thus, the heat source heat exchanger(s) 206 adds heat to the heat exchange fluid. Although FIG. 3 illustrates two heat source heat exchangers 206, the thermal management system 200 may include a single heat source heat exchanger 206 or three or more heat source heat exchangers 206.

The heat source heat exchanger(s) 206 may correspond to any suitable heat exchanger(s) that cool a fluid supporting the operation of the aircraft 10. For example, in one embodiment, at least one of the heat source heat exchangers 206 is a heat exchanger(s) of the lubrication system(s) of the engine(s) 100. In such an example, the heat source heat exchanger(s) 206 transfers heat from the oil lubricating the engine(s) 100 to the heat transfer fluid. In another example, at least one of the heat source heat exchangers 206 is a heat exchanger(s) of the cooling system of the engine(s) 100. In such an example, the heat source heat exchanger(s) 206 transfers heat from the cooling air bled from the compressor section(s) 122 (or a compressor discharge plenum) of the engine(s) 100 to the heat transfer fluid. However, in alternative examples, the heat source heat exchanger(s) 206 may correspond to any other suitable heat exchangers that cool a fluid supporting the operation of the aircraft 10.

Moreover, in several embodiments, the thermal management system 200 includes one or more bypass conduits 210. Specifically, as shown, each bypass conduit 210 is fluidly coupled to the thermal transport bus 202 such that the bypass conduit 210 allows at least a portion of the heat exchange fluid to bypass one of the heat source heat exchangers 206. In some examples, the heat exchange fluid bypasses one or more of the heat source heat exchangers 206 to adjust the temperature of the heat exchange fluid within the thermal transport bus 202. The flow of example heat exchange fluid through the bypass conduit(s) 210 is controlled to regulate the pressure and/or the temperature of the heat exchange fluid within the thermal transport bus 202. In the illustrated example of FIG. 3, each heat source heat exchanger 206 has a corresponding bypass conduit 210. However, in alternative embodiments, any number of heat source heat exchangers 206 may have a corresponding bypass conduit 210.

Additionally, in several examples, the thermal management system 200 includes one or more heat source valves 212. In general, each heat source valve 212 is configured to control the flow of the heat exchange fluid through a bypass conduit 210 that bypasses a heat source heat exchanger 206. In this respect, each heat source valve 212 is fluidly coupled to the thermal transport bus 202 and a corresponding bypass conduit 210. As such, each heat source valve 212 may be moved between fully and/or partially opened and/or closed positions to selectively occlude the flow of heat exchange through its corresponding bypass conduit 210.

The heat source valves 212 are controlled based on the pressure and/or the temperature of the heat exchange fluid within the thermal transport bus 202. More specifically, as indicated above, in certain instances, the pressure of the heat exchange fluid flowing through the thermal transport bus 202 may fall outside of a desired pressure range. When the pressure of the heat exchange fluid is too high, the thermal management system 200 may incur accelerated wear. In this respect, when the pressure of the heat exchange fluid within the thermal transport bus 202 exceeds a maximum or otherwise increased pressure value, one or more heat source valves 212 open. In such instances, at least a portion of the heat exchange fluid flows through the bypass conduits 210 instead of the heat source heat exchanger(s) 206. Thus, less heat is added to the heat exchange fluid by the heat source heat exchanger(s) 206, thereby reducing the temperature and, thus, the pressure of the fluid.

Conversely, when the pressure of the heat exchange fluid is too low, the pump 204 may experience operability problems and increased wear. As such, when the pressure of the heat exchange fluid within the thermal transport bus falls below a minimum or otherwise reduced pressure value, one or more of the heat source valves 212 close to cause the heat exchange fluid to flow through the heat source heat exchanger(s) 206 and encounter a temperature increase and, in turn, a pressure increase. As such, the thermal management system 200 may be configured to operate such that the pressure of the heat transport fluid is maintained within a predefined pressure range. For example, the thermal management system 200 can include a pressure gauge to measure the pressure in the thermal transport bus 202 and/or the pump 204. In some examples, the range extends from 1070 to 4000 pounds per square inch.

Furthermore, the pump 204 drives the flow of the heat exchange fluid through the thermal management system 200. In some examples, the thermal management system 200 includes one pump 204 or multiple pumps 204 depending on the desired flow rate, delta pressure across the pump 204, and/or the kinetic energy loss of the heat exchange fluid in the thermal transport bus 202. For example, the pump 204 may increase the output pressure head to accelerate the flow of the heat exchange fluid to a first flowrate. As the heat exchange fluid passes through the thermal transport bus 202, the example kinetic energy of the heat exchange fluid dissipates due to friction, temperature variations, etc. In some examples, due to the kinetic energy losses, the heat exchange fluid decelerates to a second flow rate at some point upstream of the pump 204. In such examples, if the example second flow rate is below a desired operating flow rate of the heat exchange fluid, then one or more additional pumps 204 can be included in the thermal management system 200.

Accordingly, the operation of the pump 204 and the heat source valves 212 allows the disclosed thermal management system 200 to maintain the pressure of the heat exchange fluid within the thermal transport bus 202 within the predefined range as the thermal load placed on the thermal management system 200 varies.

In the illustrated example of FIG. 2, the thermal transport bus 202 includes a first input conduit 214 in fluid connection with (e.g., fluidly coupled to) a first inlet of the pump 204. Specifically, the first input conduit 214 transports a portion of the heat exchange fluid to the pump 204 in response to the portion of the heat exchange fluid flowing through the heat source heat exchanger(s) 206 and/or the bypass conduit(s) 210. The thermal transport bus 202 includes a first output conduit 216 in fluid connection with (e.g., fluidly coupled to) a first outlet of the pump 204. Specifically, the first output conduit 216 transports fluid from the pump 204 towards the heat source heat exchanger(s) 206. As discussed in further detail below, the pump 204 includes a compressor that compresses and drives the heat exchange fluid received from the first input conduit 214 into the first output conduit 216. As such, the compressor heats the heat exchange fluid via compression.

Further, the thermal transport bus 202 includes a second input conduit 218 in fluid connection with (e.g., fluidly coupled to) a second inlet of the pump 204. Specifically, the second input conduit 218 transports a portion of the heat exchange fluid that flows through the heat source heat exchanger(s) 206 and/or the bypass conduit(s) 210 to the pump 204. As such, the second input conduit 218 is in fluid connection with (e.g., fluidly coupled to) the first input conduit 214. Accordingly, the first input conduit 214 transports a first portion of the heat exchange fluid to the first inlet of the pump 204 while the second input conduit 218 transports a second portion of the heat exchange fluid to the second inlet of the pump 204.

In some examples, the second input conduit 218 is in a different position in the thermal management system 200 to enable the heat exchange fluid to be within a desired temperature, pressure, and/or flow rate range in specified areas for optimal or otherwise improved thermal energy control. For example, the second input conduit 218 can be in fluid connection with (e.g., fluidly coupled to) the first output conduit 216 between the pump 204 and the heat source heat exchanger(s) 206. Additionally or alternatively, the second input conduit 218 can be in fluid connection with (e.g., fluidly coupled to) at least one of the bypass conduits 210.

As discussed in further detail below, the pump 204 includes a turbine that causes the heat exchange fluid received from the second input conduit 218 to be driven through a second outlet. Specifically, the turbine of the pump 204 causes the heat exchange fluid to expand, which reduces a temperature of the heat exchange fluid. Additionally, flow of the heat exchange fluid that enters the pump 204 via the second inlet exerts a tangential force on the turbine. As a result, the heat exchange fluid that enters the pump 204 via the second inlet helps spin the turbine. As discussed in further detail below, the turbine and the compressor of the pump 204 are coupled to opposite ends of a shaft, which is driven by a motor. As such, the tangential force that the heat exchange fluid exerts on the turbine helps rotate the shaft and, in turn, the compressor, which enables the pump 204 to drive the heat exchange fluid with a reduced work input required by the motor. As a result, enabling the motor to operate with the reduced work input can reduce a magnitude of power provided to the motor, enable a size of the motor to be reduced, and/or help reduce a temperature increase encountered by the motor over an extended operating period.

In the illustrated example of FIG. 3, the second outlet of the pump 204 is in fluid connection with (e.g., fluidly coupled to) a second output conduit 220. Further, the second output conduit 220 conveys the expanded heat exchange fluid driven by the turbine to a third inlet of the pump 204. Specifically, the third inlet is defined in a housing that includes the motor that drives the compressor and the turbine. As a result, the expanded heat exchange fluid flows around the motor and, in turn, helps cool the motor. In the illustrated example of FIG. 2, in response to absorbing heat from the motor, the heat exchange fluid exits the housing via a third outlet in fluid connection with a third output conduit 222. Further, the third output conduit 222 is in fluid connection with (e.g., fluidly coupled to) the first input conduit 214. As a result, the heat exchange fluid that helped cool the motor can re-enter the pump 204 through the first inlet. In some examples, in response to absorbing heat from the motor, at least a portion of the heat exchange fluid remains within the housing of the pump 204 and flows towards the turbine and/or the compressor. In such examples, the heat exchange fluid is driven out of the pump 204 through the first outlet and/or the second outlet.

In the illustrated example of FIG. 3, the thermal management system 200 includes control circuitry 201 communicatively coupled to the pump 204. Specifically, the control circuitry 201 is communicatively coupled to the motor of the pump 204. In the illustrated example of FIG. 3, the control circuitry 201 controls an amount of power provided to the motor. As such, the control circuitry 201 can adjust the amount of power provided to the motor to help control a rate at which the pump 204 drives the fluid and/or reduce thermal energy generated by the motor during an extended operating period. In some examples, to help the pump 204 rapidly reach and maintain a desired output, the control circuitry 201 provides a first power to the pump for a predetermined period of time. In such examples, the first power enables the pump 204 to overcome an inertial resistance that the fluid exerts against the compressor and/or the turbine during startup operations and increases an angular acceleration of the compressor and the turbine to produce a desired output. In response to the control circuitry 201 providing the first power for the predetermined period of time, the control circuitry 201 delivers a second power to the motor that has a lower magnitude than the first power because the tangential force encountered by the turbine of the pump 204 enables the pump 204 to maintain the desired output with less work from the motor. As a result, the pump 204 provides the desired output with a reduced power consumption. Additionally, the power reduction helps reduce an amount of thermal energy generated by the motor.

Figure 4:
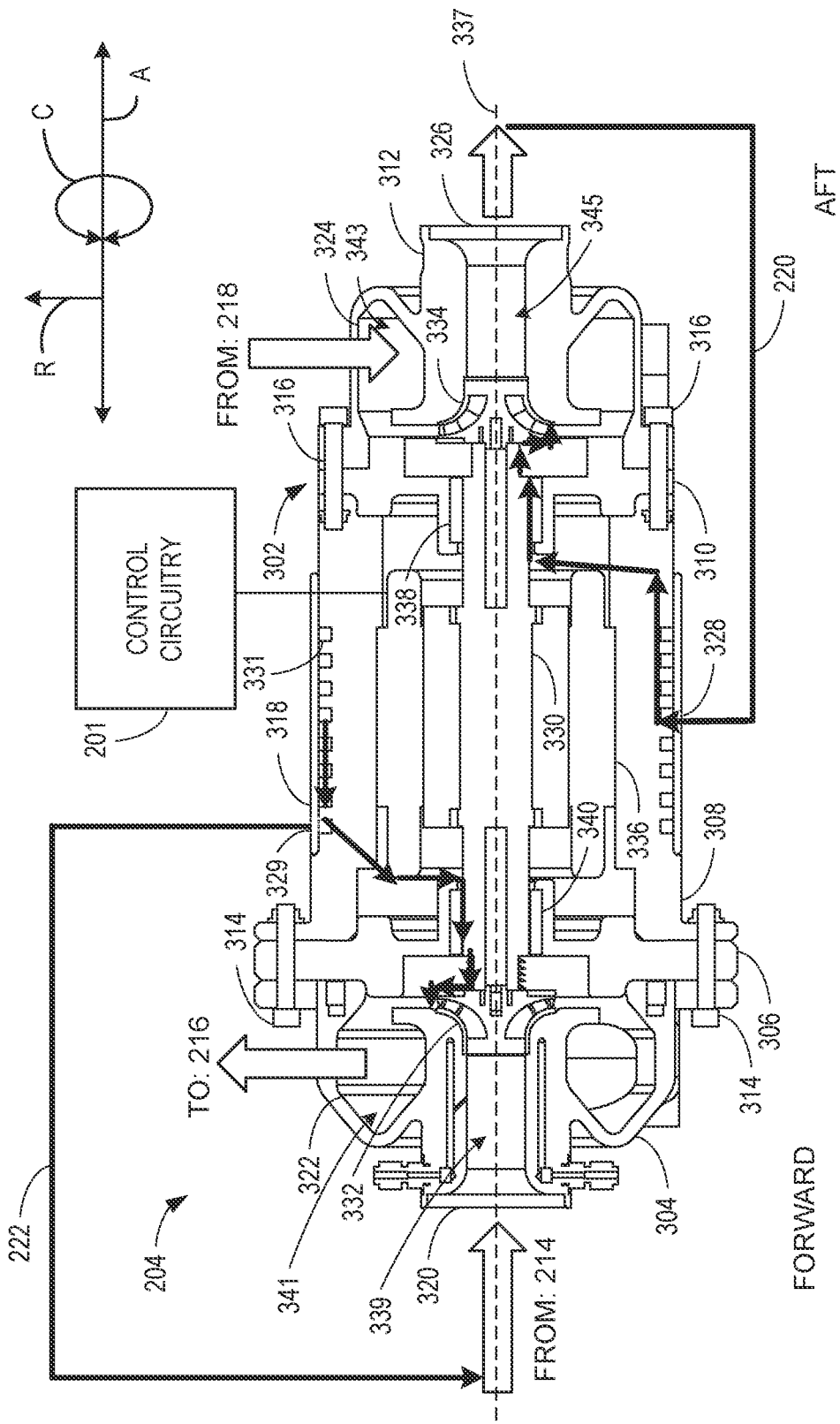
FIG. 4 illustrates an example thermal transport bus pump in accordance with the teachings disclosed herein.

FIG. 4 illustrates the pump 204 of the thermal management system 200 of FIG. 3. In the illustrated example of FIG. 4, the pump 204 includes a housing 302 defined by a compressor casing 304, a first backplate 306, a motor casing 308, a second backplate 310, and a turbine casing 312. The compressor casing 304, the first backplate 306, and the motor casing 308 are coupled via first couplings 314 (e.g., bolts, screws, etc.). The motor casing 308, the second backplate 310, and the turbine casing 312 are coupled via second couplings 316 (e.g., bolts, screws, etc.). In some examples, a cooling jacket 318 is positioned around the motor casing 308.

In the illustrated example of FIG. 4, the compressor casing 304 includes a first inlet 320 and a first outlet 322. Specifically, the compressor casing 304 is in fluid connection with (e.g., fluidly coupled to) the first input conduit 214 via the first inlet 320. Further, the compressor casing 304 is in fluid connection with (e.g., fluidly coupled to) the first output conduit 216 via the first outlet 322. The first inlet 320 is positioned on a first longitudinal end (e.g., a forward end) of the pump 204.

In the illustrated example of FIG. 4, the turbine casing 312 includes a second inlet 324 and a second outlet. The turbine casing 312 is in fluid connection with (e.g., fluidly coupled to) the second input conduit 218 via the second inlet 324. Further, the turbine casing 312 is in fluid connection with (e.g., fluidly coupled to) the second output conduit 220 via the second outlet 326. The second outlet 326 is positioned on a second longitudinal end (e.g., an aft end) of the pump 204 opposite the first longitudinal end.

In the illustrated example of FIG. 4, the motor casing 308 and/or the cooling jacket 318 includes a third inlet 328. The motor casing 308 and/or one or more ducts 331 defined between the motor casing 308 and the cooling jacket 318 are in fluid connection with (e.g., fluidly coupled to) the second output conduit 220 via the third inlet 328. Specifically, the second output conduit 220 receives fluid from the turbine casing 312 via the second outlet 326 and conveys the fluid to the motor casing 308 via the third inlet 328. In some examples, the motor casing 308 and/or the cooling jacket 318 includes a third outlet 329. In such examples, the motor casing 308 and/or one or more ducts defined between the motor casing 308 and the cooling jacket 318 are in fluid connection with (e.g., fluidly coupled to) the third output conduit 222 via the third outlet 329. In FIG. 4, the fluid flows through the first outlet 322, the second inlet 324, the third inlet 328, and the third outlet 329 in radial directions R defined by the pump 204.

In the illustrated example of FIG. 4, the pump 204 further includes a shaft 330 (e.g., a rotatable shaft), a compressor 332, a turbine 334, and a motor 336. The control circuitry 201 is communicatively coupled to the motor 336. Specifically, the control circuitry 201 provides an electrical signal to the motor 336 to enable the motor 336 to generate torque. The compressor 332 and the turbine 334 are coupled to opposite ends of the shaft 330. Further, the motor 336 is coupled to a mid-section of the shaft 330 between the compressor 332 and the turbine 334. Accordingly, the motor 336 drives a rotation of the shaft 330 and, in turn, a rotation of the compressor 332 and the turbine 334. A rotational axis of the shaft 330 defines an axial centerline 337 of the pump 204.

In the illustrated example of FIG. 4, the pump 204 includes a first bearing 338 and a second bearing 340 to provide radial support to the shaft 330. In FIG. 4, the bearings 338, 340 are foil bearings (e.g., hydrostatic gas foil bearings, foil-air bearings, fluid bearings, etc.) positioned on opposite sides of the motor 336. The first bearing 338 is coupled to the first backplate 306. The second bearing 340 is coupled to the second backplate 310. For example, the first bearing 338 and the second bearing 340 can be coupled to the first backplate 306 and the second backplate 310, respectively, via a press fit connection. In some examples, the pump 204 includes a thrust bearing (not shown).

During operations, fluid flows in an axial direction A defined by the pump 204 through the first inlet 320 and into the compressor casing 304. Specifically, the fluid that enters the compressor casing 304 through the first inlet 320 flows in a first axial direction A (e.g., to the right in the view of FIG. 4, towards an entrance of the second output conduit 220). Further, the compressor 332 drives the fluid in a radial direction R defined by the pump 204 and causes the fluid to flow through the first outlet 322. Specifically, the fluid that exits the compressor casing 304 through the first outlet 322 flows in a first radial direction (e.g., upwards in the view of FIG. 4, away from the axial centerline 337). The compressor 332 causes the fluid to compress, which increases a temperature of the fluid. Specifically, the compressor casing 304 defines a first portion 339 of a flow path for the fluid upstream of the compressor 332 (e.g., between the compressor 332 and the first inlet 320) and a second portion 341 of the flow path for the fluid downstream of the compressor 332 (e.g., between the compressor 332 and the first outlet 322). The first portion 339 of the flow path has a first cross-sectional area and the second portion 341 of the flow path has a second cross-sectional area larger than the first cross-sectional area. The compressor 332 pumps the fluid from the first portion 339 of the flow path to the second portion 341 to increase the pressure and the temperature of the fluid. Thus, the compressor 332 causes the pressure of the fluid to increase from a first pressure as the fluid flows through the first inlet 320 to a second pressure as the fluid flows through the first outlet 322.

In the illustrated example of FIG. 4, in response to exiting the pump 204, the fluid flows through the first output conduit 216. In turn, the first output conduit 216 can convey the fluid to the heat source heat exchangers 206 (FIG. 2) where the fluid can absorb heat from a working fluid and/or component(s) associated with the aircraft 10 (FIG. 1) and/or the engine 100 (FIGS. 1 and 2). Further, a first portion of the fluid can enter the first input conduit 214 and a second portion of the fluid can enter the second input conduit 218. Accordingly, the first portion of the fluid flows towards the first inlet 320 and the second portion of the fluid flows towards the second inlet 324.

In the illustrated example of FIG. 4, the fluid flows through the second inlet 324 in a second radial direction defined by the pump 204 (e.g., downwards in the view of FIG. 4, towards the axial centerline 337). In response to entering the turbine casing 312 through the second inlet 324, the fluid exerts a tangential force on the turbine 334, which provides the turbine 334 with an angular acceleration that helps the turbine 334 as well as the shaft 330 and the compressor 332 rotate. As such, by exerting the tangential force on the turbine 334, the fluid enables compressor 332 to rotate with reduced drive from the motor 336. As a result, the control circuitry 201 can reduce a power input delivered to the motor 336, which reduces a power consumption of the thermal management system 200 (FIG. 2) and helps prevent the motor 336 from overheating. For example, the control circuitry 201 can reduce the power delivered to the motor 336 by over 10% while the tangential force from the fluid on the turbine 334 helps maintain the angular acceleration of the compressor 332. In some examples, such power savings enables the size of the motor 336 to be reduced, which reduces a weight of the pump 204.

Furthermore, the turbine 334 drives the fluid in the first axial direction A (e.g., to the right in the view of FIG. 4, towards an entrance of the second output conduit 220) through the second outlet 326. Specifically, the turbine casing 312 defines a third portion 343 of the flow path upstream of the turbine 334 (e.g., between the turbine 334 and the second inlet 324) and a fourth portion 345 of the flow path downstream of the turbine 334. The third portion 343 has a larger cross-sectional area than the fourth portion 345 such that the turbine 334 causes the fluid to expand. As a result, the turbine 334 reduces the temperature of the fluid. Additionally, by driving the fluid, the turbine 334 helps balance a thrust load encountered by the shaft 330 as a result of flow encountered by the compressor 332.

In the illustrated example of FIG. 4, in response to being driven through the second outlet 326, the second output conduit 220 conveys the fluid to the third inlet 328. Specifically, the fluid flows through the third inlet 328 in a third inlet 328 defined by the pump 204 (e.g., upwards in the view of FIG. 4, towards the axial centerline 337). In some examples, the fluid enters the motor casing 308 and flows around the motor 336. The expansion of the fluid caused by the turbine 334 enables the fluid to absorb thermal energy from (i.e., cool) the motor 336 in response to entering and/or flowing around the motor casing 308. By cooling the motor 336, the fluid helps prevent the motor 336 from overheating. Additionally, the cooled fluid flowing around the motor 336 helps reduce vibrations and improves a stability of the shaft 330, which improves an efficiency with which the compressor 332 and the turbine 334 drives the fluid out of the pump 204. In some examples, the fluid flows in the ducts 331 between the motor casing 308 and the cooling jacket 318. In such examples, the fluid can absorb heat from the cooling jacket 318 to help the cooling jacket 318 cool the motor casing 308 and, in turn, the motor 336. Additionally, the fluid can exit the ducts 331 and flow into the third output conduit 222 via the third outlet 329. In turn, the third output conduit 222 can convey the fluid to the first input conduit 214. Advantageously, the turbine 334 helps remove or otherwise reduce the need for an additional heat exchanger(s) to reduce the temperature of the fluid and cool the motor 336. As a result of utilizing the turbine 334 instead of an additional heat exchanger(s), a size, a weight, and/or a cost of the thermal management system 200 associated with the pump 204 can be reduced relative to conventional thermal management systems.

In the illustrated example of FIG. 4, in response to cooling the motor 336, the fluid flows between the bearings 338, 340 and the shaft 330. Specifically, as the shaft 330 rotates, the fluid can cause an inner foil lining of the bearings 338, 340 to move away from a perimeter of the shaft 330 and prevent or otherwise reduce contact between the shaft 330 and the bearings 338, 340. As such, the bearings 338, 340 can provide lubrication between the bearings 338, 340 and the shaft 330 as the shaft 330 rotates. Furthermore, a first portion of the fluid that enters the motor casing 308 can flow past a forward end of the shaft 330 and into the compressor casing 304. The compressor 332 can compress and, in turn, increase the thermal energy of (e.g., heat) the first portion of the fluid as the first portion of the fluid is driven towards the first output conduit 216. Similarly, a second portion of the fluid that enters the motor casing 308 can flow past an aft end of the shaft 330 and into the turbine casing 312. The turbine 334 can expand and, in turn, reduce the thermal energy of (e.g., cool) the second portion of the fluid as the second portion of the fluid is driven towards the second output conduit 220.

In some examples, the thermal management system 200 includes means for pumping a fluid. For example, the means for pumping may be implemented by the pump 204.

In some examples, the means for pumping includes means for compressing the fluid. For example, the means for compressing may be implemented by the compressor 332.

In some examples, the means for pumping includes first means for housing the means for compressing. For example, the first means for housing may be implemented by the compressor casing 304.

In some examples, the means for pumping includes means for expanding the fluid. For example, the means for expanding may be implemented by the turbine 334.

In some examples, the means for pumping includes second means for housing the means for expanding. For example, the second means for housing may be implemented by the turbine casing 312. In some examples, the fluid flows in a same direction when entering the first means for housing and exiting the second means for housing.

In some examples, the means for pumping includes means for driving the means for compressing and the means for expanding. For example, the means for driving may be implemented by the shaft 330 and the motor 336.

In some examples, the means for pumping includes third means for housing the means for driving. For example, the third means for housing may be implemented by the motor casing 308.

In some examples, the third means for housing includes means for guiding the fluid into at least one of the first means for housing or the second means for housing. For example, the means for guiding may be implemented by the first bearing 338 and/or the second bearing 340.

In some examples, the thermal management system 200 includes first means for transporting the fluid from the first means for housing to the second means for housing. For example, the first means for transporting may be implemented by the first output conduit 216 and the second input conduit 218.

In some examples, the thermal management system 200 includes second means for transporting the fluid from the second means for housing to the third means for housing. For example, the second means for transporting may be implemented by the second output conduit 220.

In some examples, the thermal management system 200 includes third means for transporting the fluid from the third means for housing to the first means for transporting. For example, the third means for transporting may be implemented by the third output conduit 222.

In some examples, the means for pumping includes means for supporting the means for driving. For example, the means for supporting may be implemented by the first bearing 338 and/or the second bearing 340. In such examples, the fluid flows between the means for supporting and the means for driving in response to entering the third means for housing.

In some examples, the thermal management system 200 includes means for heating the fluid coupled to the first means for transporting. For example, the means for heating may be implemented by the heat source heat exchangers 206.

Figure 5:
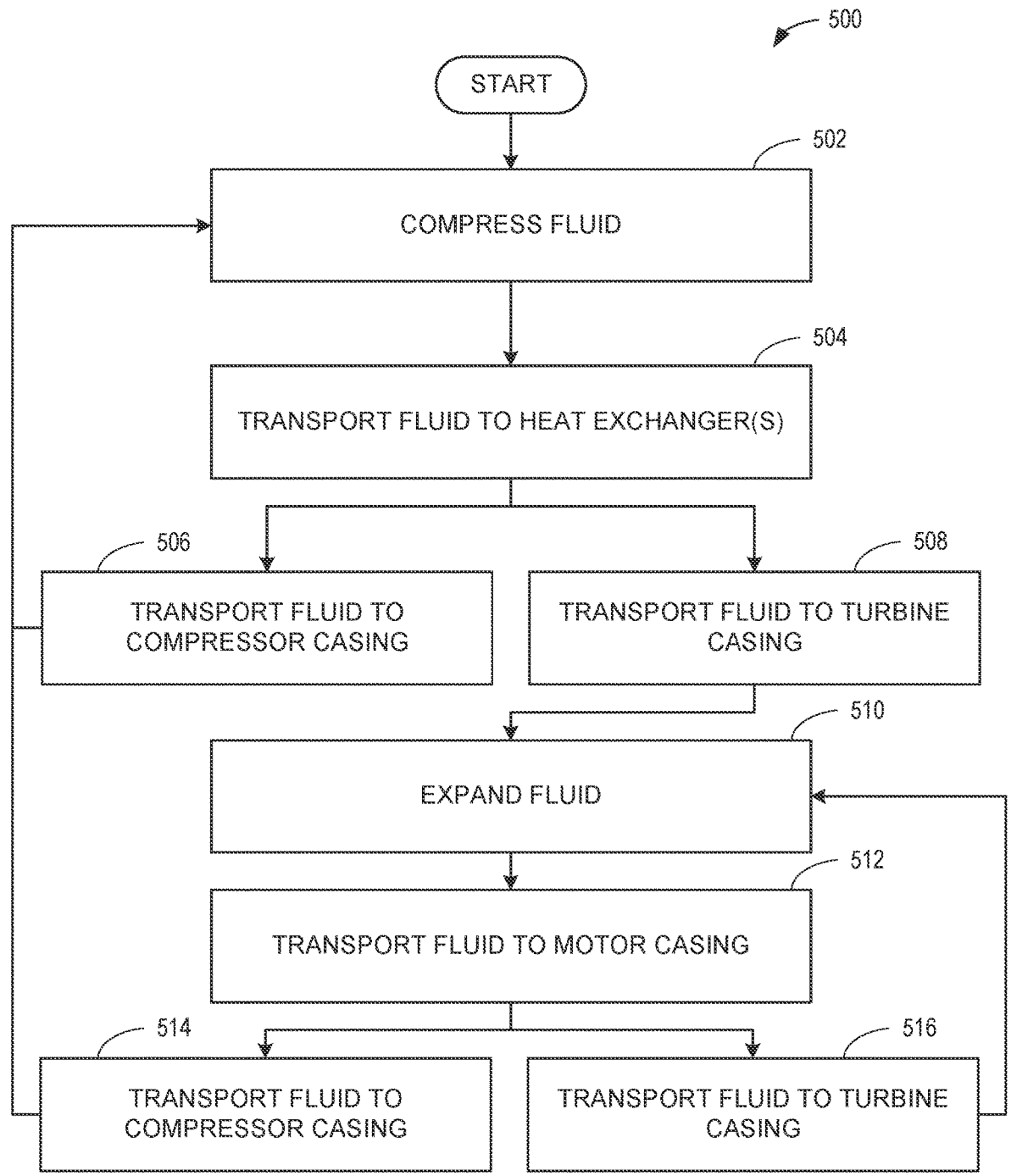
FIG. 5 is a flowchart representative of example operations performed by the thermal management system of FIG. 3.

FIG. 5 is a flowchart representative of example operations 500 performed by the thermal management system 200 of FIGS. 1, 2, and 3. At block 502, the thermal management system 200 compresses a fluid. For example, the pump 204 compresses the fluid. Specifically, the compressor 332 compresses the fluid that enters the pump 204 via the first inlet 320.

At block 504, the thermal management system 200 transports the fluid to the heat source heat exchanger(s) 206. For example, the compressor 332 of the pump 204 drives the compressed fluid through the first output conduit 216, which conveys the compressed fluid to the heat source heat exchanger(s) 206. In some examples, at least a portion of the compressed fluid flows through the bypass conduits 210 and avoids one or more of the heat source heat exchanger(s) 206.

At block 506, the thermal management system 200 transports the fluid to the compressor casing 304. For example, the first input conduit 214 conveys a first portion of the fluid to the first inlet 320 defined by the compressor casing 304.

At block 508, the thermal management system 200 transports the fluid to the turbine casing 312. For example, the second input conduit 218 conveys a second portion of the fluid to the second inlet 324 defined by the turbine casing 312.

At block 510, the thermal management system 200 expands the fluid. For example, the turbine 334 expands the fluid in the turbine casing 312. In turn, the expanded fluid flows through the second outlet 326 defined by the turbine casing 312.

At block 512, the thermal management system 200 transports the fluid to the motor casing 308. For example, the second output conduit 220 conveys the fluid from the second outlet 326 to the third inlet 328 defined by the motor casing 308. As a result, the expanded fluid can flow in and/or around the motor casing 308 to absorb thermal energy from the motor 336.

At block 514, the thermal management system 200 transports the fluid to the compressor casing 304. In some examples, the fluid flows from the motor casing 308 directly into the compressor casing 304. For example, the fluid can flow between the shaft 330 and the second bearing 340 and flow past the forward end of the shaft 330 to enter the compressor casing 304. In some examples, the fluid exits the duct(s) 331 between the motor casing 308 and the cooling jacket 318 via the third outlet 329. In such examples, the third output conduit 222 conveys the fluid from the duct(s) 331 to the first input conduit 214. In turn, the first input conduit 214 transports the fluid to the compressor casing 304.

At block 516, the thermal management system 200 transports the fluid to the turbine casing 312. For example, the fluid can flow directly from the motor casing 308 into the turbine casing 312. Specifically, the fluid can flow between the shaft and the first bearing 338 and flow past the aft end of the shaft 330 to enter the turbine casing 312.

The control circuitry 201 of FIG. 3 may be implemented by hardware alone or by hardware in combination with software and/or firmware. For example, the control circuitry 201, could be implemented by processor circuitry, analog circuit(s), digital circuit(s), logic circuit(s), programmable processor(s), programmable microcontroller(s), graphics processing unit(s) (GPU(s)), digital signal processor(s)

(DSP(s)), application specific integrated circuit(s) (ASIC(s)), programmable logic device(s) (PLD(s)), and/or field programmable logic device(s) (FPLD(s)) such as Field Programmable Gate Arrays (FPGAs).

Figure 6:
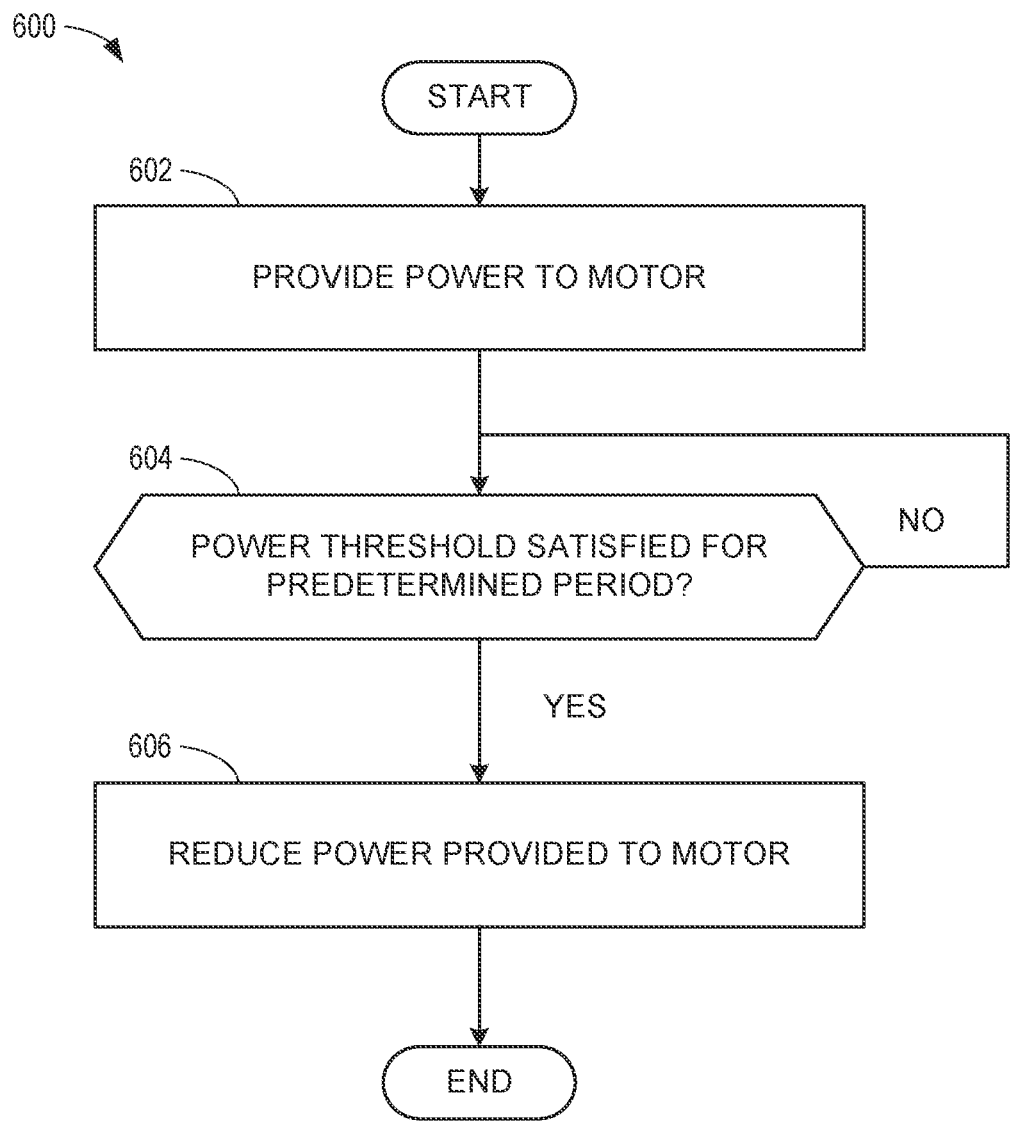
FIG. 6 is a flowchart representative of example machine readable instructions and/or example operations that may be executed by example processor circuitry to implement example control circuitry associated with the thermal transport bus pump of FIG. 4.

A flowchart representative of example machine readable instructions, which may be executed to configure processor circuitry to implement the control circuitry 201 of FIG. 2, is shown in FIG. 6. The machine readable instructions may be one or more executable programs or portion(s) of an executable program for execution by processor circuitry, such as the processor circuitry 712 shown in the example processor platform 700 discussed below in connection with FIG. 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example control circuitry 201 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information).

FIG. 6 is a flowchart representative of example machine readable instructions and/or example operations 600 that may be executed and/or instantiated by processor circuitry to save electrical power utilized to rapidly meet and maintain a certain flow rate using the pump 204 of FIGS. 3-4. The machine readable instructions and/or the operations 600 of FIG. 6 begin at block 602, at which the control circuitry 201 provides power to the motor 336 of the pump 204. As a result, the motor 336 rotates the shaft 330, which causes the compressor 332 and the turbine 334 to rotate. Accordingly, the compressor 332 drives fluid through the first outlet 322, and the turbine drives fluid through the second outlet 326.

At block 604, the control circuitry 201 determines whether the power provided to the motor 336 has satisfied a power threshold for at least a predetermined period of time. For example, the power threshold and/or the predetermined period of time can be associated with a desired output of the pump 204 (e.g., a desired flow rate, a desired pressure of the fluid in the thermal transport bus 202, etc.). For example, the power threshold and/or the predetermined period of time enable the pump 204 to overcome an initial resistance caused by fluid inertia during startup operations and rapidly (e.g., within 1 second, within 5 seconds, etc.) meet a desired output flow rate. In response to the power provided to the motor 336 satisfying the power threshold for at least the predetermined period of time, the operations 600 proceed to block 606. Otherwise, the operations 600 repeat block 604.

At block 606, the control circuitry 201 reduces the power provided to the motor 336. For example, in response to the power provided to the motor 336 satisfying the power threshold for at least the predetermined period of time, the driven fluid exerts a tangential force on the turbine 334 that contributes to an angular acceleration of the turbine 334 and, in turn, an angular acceleration of the shaft 330 and the compressor 332. As a result, the compressor 332 and the turbine 334 can produce a desired output with less work from the motor 336, which enables the control circuitry 201 to reduce the power provided to the motor 336 while the pump 204 maintains a desired output.

Figure 7:
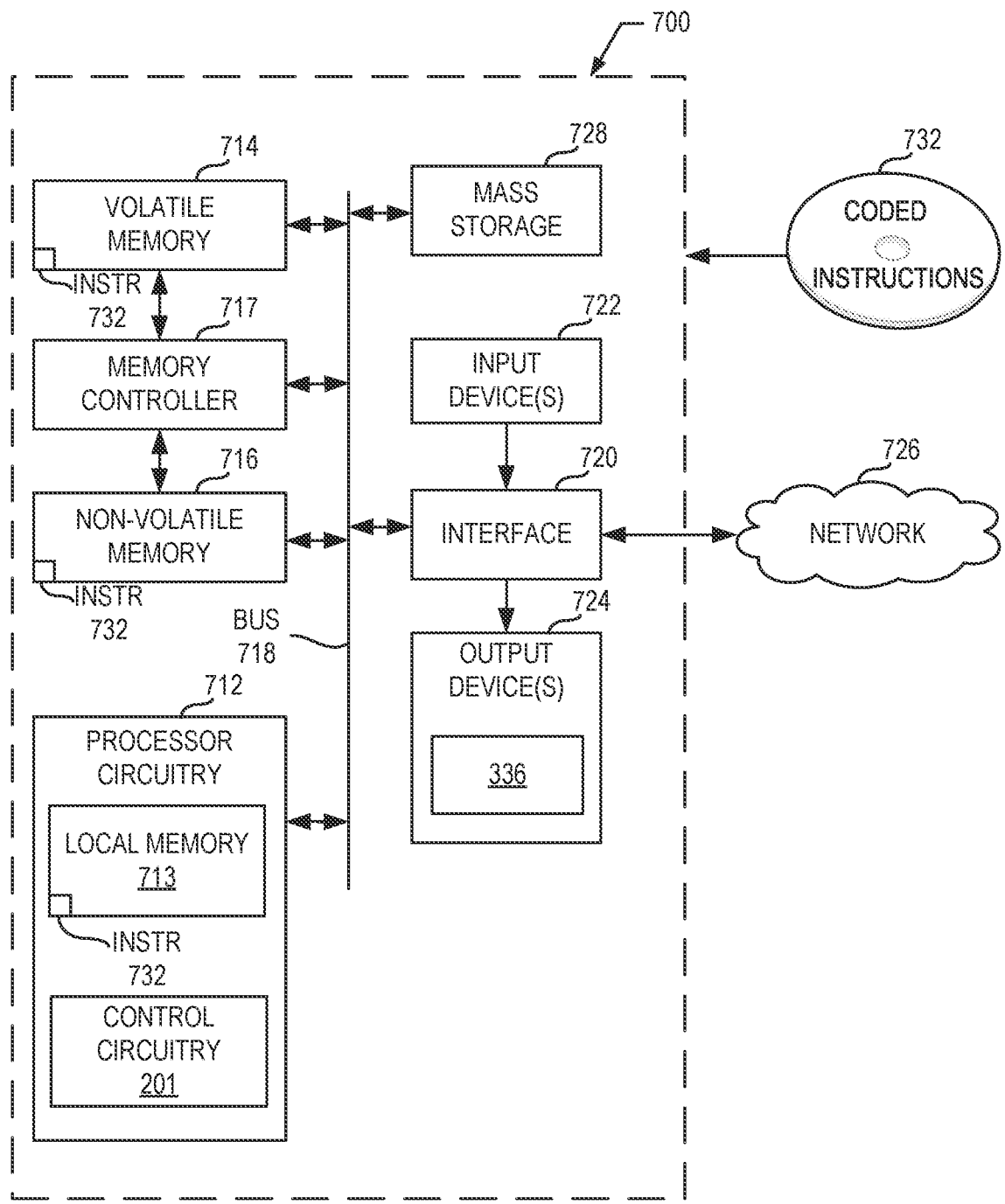
FIG. 7 is a block diagram of an example processing platform including processor circuitry structured to execute the example machine readable instructions and/or the example operations of FIG. 6 to implement the control circuitry associated with the thermal transport bus pump of FIG. 4.

FIG. 7 is a block diagram of an example processor platform 700 structured to execute and/or instantiate the machine readable instructions and/or the operations of FIG. 6 to implement the control circuitry 201 of FIGS. 3-4. The processor platform 700 can be, for example, a digital computer (e.g., a FADEC, an EEC, an ECU, etc.) or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the control circuitry 201.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a pressure sensor, a temperature sensor, a position sensor, and/or any other sensor.

One or more output devices 724 are also connected to the interface circuitry 720 of the illustrated example. The output device(s) 724 can be implemented, for example, by one or more actuator(s) and/or one or more heat exchanger(s). In this example, the output device(s) 724 implements the motor 336. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIG. 6, may be stored in the mass storage device 728, in the volatile memory 714, in the non-volatile memory 716, and/or on a removable non-transitory computer readable storage medium such as a CD or DVD.

From the foregoing, it will be appreciated that example dual compression-expansion fluid pumps and related methods are disclosed. Disclosed examples utilize a turbine to cool fluid, reduce a burden on a motor in the fluid pump, reduce vibrations encountered by the pump, and help balance a thrust encountered as a result of pumping the fluid. Additionally, disclosed examples remove or otherwise reduce a need for heat sink heat exchangers in the thermal management system.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example dual compression-expansion pumps are disclosed herein. Further examples and combinations thereof include the following:

Example 1 includes a fluid pump comprising a shaft, a motor coupled to the shaft, the motor to drive a rotation of the shaft, a compressor coupled to a first end of the shaft, a turbine coupled to a second end of the shaft opposite the first end, and a housing including a first inlet, a second inlet, a third inlet, a first outlet, and a second outlet, the first outlet fluidly coupled to the second inlet, the second outlet fluidly coupled to the third inlet.

Example 2 includes the fluid pump of any preceding example, wherein the compressor is to drive a fluid that enters the housing via the first inlet through the first outlet, at least a portion of the fluid to enter the housing via the second inlet in response to being driven by the compressor, the turbine to drive the at least the portion of the fluid through the second outlet in response to the fluid entering the housing via the second inlet, and wherein thermal energy is to be transferred between the motor and the at least the portion of the fluid in response to the at least the portion of the fluid entering the housing via the third inlet.

Example 3 includes the fluid pump of any preceding example, wherein the first inlet and the second outlet are aligned with a rotational axis of the shaft.

Example 4 includes the fluid pump of any preceding example, wherein the first outlet, the second inlet, and the third inlet are oriented to receive a fluid flowing in radial directions.

Example 5 includes the fluid pump of any preceding example, further including foil bearings to support the shaft on opposite sides of the motor, wherein a fluid that enters the fluid pump via the third inlet is positioned between the foil bearings and the shaft.

Example 6 includes the fluid pump of any preceding example, wherein the housing is defined by a compressor casing, a motor casing, and a turbine casing, the compressor casing including the first inlet and the first outlet, the turbine casing including the second inlet and the second outlet, the motor casing including the third inlet, and wherein the fluid flows into at least one of the compressor casing or the turbine casing in response to flowing between the foil bearings and the shaft.

Example 7 includes the fluid pump of any preceding example, wherein the first inlet is on a first longitudinal end of the fluid pump and the second outlet is on a second longitudinal end of the fluid pump opposite the first longitudinal end.

Example 8 includes a system comprising at least one conduit to transport a fluid, a pump including a rotatable shaft, a compressor casing defining a first inlet and a first outlet in fluid connection with the at least one conduit, a compressor positioned in the compressor casing, the compressor coupled to a first end of the rotatable shaft, a turbine casing defining a second inlet and a second outlet in fluid connection with the at least one conduit, a turbine positioned in the turbine casing, the turbine coupled to a second end of the rotatable shaft opposite the first end, a motor casing defining a third inlet, and a motor positioned in the motor casing, the motor coupled to the rotatable shaft between the first end and the second end.

Example 9 includes the system of any preceding example, wherein the compressor casing defines a first portion of a flow path for a fluid upstream of the compressor and a second portion of the flow path downstream of the compressor, the second portion of the flow path having a larger cross-sectional area than the first portion of the flow path, wherein the turbine casing defines a third portion of the flow path upstream of the turbine and a fourth portion of the flow path downstream of the turbine, the third portion of the flow path having a larger cross-sectional area than the fourth portion of the flow path.

Example 10 includes the system of any preceding example, wherein a fluid flows in a first radial direction through the first outlet, wherein the fluid flows in a second radial direction different from the first radial direction through the second inlet, and wherein the fluid flows in the second radial direction or a third radial direction through the third inlet.

Example 11 includes the system of any preceding example, wherein the motor casing includes a third outlet in fluid connection with the at least one conduit.

Example 12 includes the system of any preceding example, wherein the pump further includes foil bearings positioned around the rotatable shaft on opposite sides of the motor, and wherein a fluid that enters the motor casing via the third inlet flows between the rotatable shaft and the foil bearings.

Example 13 includes the system of any preceding example, wherein a fluid that enters the motor casing via the third inlet includes a first portion and a second portion, wherein the first portion flows into the compressor casing, and wherein the second portion flows into the turbine casing.

Example 14 includes the system of any preceding example, wherein a fluid has a first pressure at the first inlet, wherein the compressor causes the first pressure to increase to a second pressure greater than the first pressure at the first outlet, and wherein the fluid has a third pressure at the second inlet, and the turbine causes the third pressure to decrease to a fourth pressure less than the third pressure at the second outlet.

Example 15 includes the system of any preceding example, wherein a fluid has a first temperature at the second inlet, and wherein the turbine causes the fluid to have a second temperature less than the first temperature at the second outlet.

Example 16 includes the system of any preceding example, wherein the compressor causes the fluid to have a third temperature at the first outlet, the third temperature less than the first temperature.

Example 17 includes the system of any preceding example, further including at least one heat exchanger operatively coupled to the at least one conduit.

Example 18 includes an apparatus comprising means for pumping a fluid, the means for pumping including means for compressing the fluid, first means for housing the means for compressing, means for expanding the fluid, second means for housing the means for expanding, means for driving the means for compressing and the means for expanding, and third means for housing the means for driving, first means for transporting the fluid from the first means for housing to the second means for housing, and second means for transporting the fluid from the second means for housing to the third means for housing.

Example 19 includes the apparatus of any preceding example, wherein the fluid flows in a same direction when entering the first means for housing and exiting the second means for housing.

Example 20 includes the apparatus of any preceding example, further including means for supporting the means for driving, wherein the fluid flows between the means for supporting and the means for driving in response to entering the third means for housing.

Example 21 is a method comprising compressing a fluid, transporting the fluid to one or more heat exchangers, transporting a first portion of the fluid to a compressor casing, transporting a second portion of the fluid to a turbine casing, expanding the second portion of the fluid, transporting the second portion of the fluid to the motor casing, transporting a first share of the second portion of the fluid to the compressor casing, and transporting a second share of the second portion of the fluid to the turbine casing.

Example 22 is an apparatus comprising a memory, machine readable instructions, and processor circuitry to at least one of instantiate or execute the machine readable instructions to cause a first power to be delivered to a motor, determine whether a power output of the motor satisfies a power threshold for at least a predetermined period of time, and, in response to the power output of the motor satisfying the power threshold for at least the threshold period of time, cause a second power to be delivered to the motor, the second power having a lower magnitude than the first power.

What is claimed is:

1. A fluid pump comprising:
    a shaft;
    a motor coupled to the shaft, the motor to drive a rotation of the shaft;
    a compressor coupled to a first end of the shaft;
    a turbine coupled to a second end of the shaft opposite the first end;
    a housing including a first inlet, a second inlet, a third inlet, a first outlet, and a second outlet, the first outlet fluidly coupled to the second inlet, the second outlet fluidly coupled to the third inlet, wherein the housing is defined by a compressor casing, a motor casing, and a turbine casing, the compressor casing including the first inlet and the first outlet, the turbine casing including the second inlet and the second outlet, the motor casing including the third inlet; and
    foil bearings to support the shaft on opposite sides of the motor, wherein a fluid that enters the fluid pump via the third inlet is positioned between the foil bearings and the shaft, and wherein the fluid flows into at least one of the compressor casing or the turbine casing in response to flowing between the foil bearings and the shaft.

2. The fluid pump of claim 1, wherein the compressor is to drive the fluid that enters the housing via the first inlet through the first outlet, at least a portion of the fluid to enter the housing via the second inlet in response to being driven by the compressor, the turbine to drive the at least the portion of the fluid through the second outlet in response to the fluid entering the housing via the second inlet, and wherein thermal energy is to be transferred between the motor and the at least the portion of the fluid in response to the at least the portion of the fluid entering the housing via the third inlet.

3. The fluid pump of claim 1, wherein the first inlet and the second outlet are aligned with a rotational axis of the shaft.

4. The fluid pump of claim 1, wherein the first outlet, the second inlet, and the third inlet are oriented to receive the fluid flowing in radial directions.

5. The fluid pump of claim 1, wherein the first inlet is on a first longitudinal end of the fluid pump and the second outlet is on a second longitudinal end of the fluid pump opposite the first longitudinal end.

6. A system comprising:
    at least one conduit to transport a fluid;
    a pump including:
        a rotatable shaft;
        a compressor casing defining a first inlet and a first outlet in fluid connection with the at least one conduit;
        a compressor positioned in the compressor casing, the compressor coupled to a first end of the rotatable shaft;
        a turbine casing defining a second inlet and a second outlet in fluid connection with the at least one conduit;
        a turbine positioned in the turbine casing, the turbine coupled to a second end of the rotatable shaft opposite the first end, wherein the fluid has a first temperature at the second inlet, wherein the compressor causes the fluid to have a second temperature at the first outlet, the second temperature less than the first temperature;
        a motor casing defining a third inlet; and
        a motor positioned in the motor casing, the motor coupled to the rotatable shaft between the first end and the second end.

7. The system of claim 6, wherein the compressor casing defines a first portion of a flow path for the fluid upstream of the compressor and a second portion of the flow path downstream of the compressor, the second portion of the flow path having a larger cross-sectional area than the first portion of the flow path, wherein the turbine casing defines a third portion of the flow path upstream of the turbine and a fourth portion of the flow path downstream of the turbine, the third portion of the flow path having a larger cross-sectional area than the fourth portion of the flow path.

8. The system of claim 6, wherein the fluid flows in a first radial direction through the first outlet, wherein the fluid flows in a second radial direction different from the first radial direction through the second inlet, and wherein the fluid flows in the second radial direction or a third radial direction through the third inlet.

9. The system of claim 6, wherein the motor casing includes a third outlet in fluid connection with the at least one conduit.

10. The system of claim 6, wherein the pump further includes foil bearings positioned around the rotatable shaft on opposite sides of the motor, and wherein the fluid that enters the motor casing via the third inlet flows between the rotatable shaft and the foil bearings.

11. The system of claim 6, wherein the fluid that enters the motor casing via the third inlet includes a first portion and a second portion, wherein the first portion flows into the compressor casing, and wherein the second portion flows into the turbine casing.

12. The system of claim 6, wherein the fluid has a first pressure at the first inlet, wherein the compressor causes the first pressure to increase to a second pressure greater than the first pressure at the first outlet, and wherein the fluid has a third pressure at the second inlet, and the turbine causes the third pressure to decrease to a fourth pressure less than the third pressure at the second outlet.

13. The system of claim 6, wherein the turbine causes the fluid to have a third temperature less than the first temperature at the second outlet.

14. The system of claim 6, further including at least one heat exchanger operatively coupled to the at least one conduit.

15. An apparatus comprising:
    means for pumping a fluid, the means for pumping including:
        means for compressing the fluid;
        first means for housing the means for compressing;
        means for expanding the fluid;
        second means for housing the means for expanding;
        means for driving the means for compressing and the means for expanding;
        third means for housing the means for driving; and means for supporting the means for driving, wherein the fluid flows between the means for supporting and the means for driving in response to entering the third means for housing, and wherein the fluid flows into at least one of the first means for housing or the second means for housing in response to flowing between the means for supporting and the means for driving;

first means for transporting the fluid from the first means for housing to the second means for housing; and second means for transporting the fluid from the second means for housing to the third means for housing.

16. The apparatus of claim 15, wherein the fluid flows in a same direction when entering the first means for housing and exiting the second means for housing.

17. The apparatus of claim 15, further including means for supporting the means for driving, wherein the fluid flows between the means for supporting and the means for driving in response to entering the third means for housing.

18. The fluid pump of claim 1, wherein the fluid has a first temperature at the second inlet, wherein the compressor causes the fluid to have a second temperature at the first outlet, the second temperature less than the first temperature.

19. The system of claim 6, further including foil bearings to support the rotatable shaft on opposite sides of the motor, wherein the fluid that enters the fluid pump via the third inlet is positioned between the foil bearings and the rotatable shaft, and wherein the fluid flows into at least one of the compressor casing or the turbine casing in response to flowing between the foil bearings and the shaft.

\* \* \* \* \*